(12) United States Patent
Privault et al.

(10) Patent No.: US 8,860,763 B2
(45) Date of Patent: Oct. 14, 2014

(54) REVERSIBLE USER INTERFACE COMPONENT

(75) Inventors: Caroline Privault, Montbonnot-Saint-Martin (FR); Fabien Guillot, Grenoble (FR); Yves Hoppenot, Notre-Dame-de-Mesage (FR); Christophe Legras, Meylan (FR)

(73) Assignee: Xerox Corporation, Norwalk, CT (US)

( * ) Notice: Subject to any disclaimer, the term of this patent is extended or adjusted under 35 U.S.C. 154(b) by 214 days.

(21) Appl. No.: 13/362,212

(22) Filed: Jan. 31, 2012

(65) Prior Publication Data
US 2013/0194308 A1 Aug. 1, 2013

(51) Int. Cl.
*G09G 5/02* (2006.01)
*G06T 11/60* (2006.01)

(52) U.S. Cl.
CPC .................................... *G06T 11/60* (2013.01)
USPC ......................................................... 345/650

(58) Field of Classification Search
None
See application file for complete search history.

(56) References Cited

U.S. PATENT DOCUMENTS

| | | | |
|---|---|---|---|
| 5,062,143 A | 10/1991 | Schmitt | |
| 7,058,567 B2 | 6/2006 | Ait-Mokhtar et al. | |
| 7,711,747 B2 | 5/2010 | Renders et al. | |
| 7,720,848 B2 | 5/2010 | Guerraz et al. | |
| 7,813,919 B2 | 10/2010 | Goutte | |
| 7,984,384 B2 | 7/2011 | Chaudhri et al. | |
| 2007/0035564 A1* | 2/2007 | Katsuyama | 345/649 |
| 2008/0168368 A1 | 7/2008 | Louch et al. | |
| 2008/0168382 A1* | 7/2008 | Louch et al. | 715/781 |
| 2009/0077501 A1 | 3/2009 | Partridge et al. | |
| 2009/0100343 A1 | 4/2009 | Lee | |
| 2009/0128505 A1 | 5/2009 | Partridge et al. | |
| 2009/0228824 A1 | 9/2009 | Forstall et al. | |
| 2010/0088073 A1 | 4/2010 | Perronnin et al. | |
| 2010/0198654 A1* | 8/2010 | Kumar et al. | 705/10 |
| 2010/0312725 A1 | 12/2010 | Privault et al. | |
| 2010/0313124 A1 | 12/2010 | Privault et al. | |
| 2011/0169748 A1* | 7/2011 | Tse et al. | 345/173 |
| 2011/0282892 A1 | 11/2011 | Castellani et al. | |
| 2011/0296357 A1* | 12/2011 | Kim | 715/863 |
| 2012/0084689 A1* | 4/2012 | Ledet et al. | 715/769 |
| 2012/0260217 A1* | 10/2012 | Celebisoy | 715/836 |

OTHER PUBLICATIONS

U.S. Appl. No. 13/031,336, filed Feb. 21, 2011, Privault et al.
U.S. Appl. No. 12/976,196, filed Dec. 22, 2010, Hoppenot et al.

(Continued)

*Primary Examiner* — Ke Xiao
*Assistant Examiner* — Xilin Guo
(74) *Attorney, Agent, or Firm* — Fay Sharpe LLP

(57) ABSTRACT

A method of configuring a widget and a tactile user interface which displays the widget are disclosed which enable menu-setting operations with minimal touch gestures and occupation of screen space. The interface includes a touch sensitive display device and memory which stores instructions for displaying the widget and a set of graphic objects together on the display device. The widget has two or more virtual sides, each of the sides being associated with a respective functionality. The widget is flipped, in response to a recognized touch gesture, from a first of the sides to a second of the sides, whereby the functionality of the widget is changed. The graphic objects are associated, in memory, with respective items having attributes. The graphic objects exhibit a response to the widget functionality of a currently displayed one of the sides of the widget based on the attributes of the respective items.

24 Claims, 9 Drawing Sheets

(56) References Cited

OTHER PUBLICATIONS

Grefenstette, G. "Comparing Two Language Identification Schemes", Proc. 3$^{rd}$ Intl. Conf. on the Statistical Analysis of Textual Data, JADT'95, Dec. 1995, pp. 1-6.

Chanod, et al. "Tagging French text: tagset, dedicated lexicons and guesser", Proc. From Texts to Tags: Issues in Multilingual Language Analysis, Dublin 1995, pp. 1-8.

PyMT: Python Multi-touch library, "Flippable Widget: A widget with 2 sides who can flip between the sides", Retrieved Jan. 4, 2012, from http://pymt.eu/docs/api/api-pymt.ui.widgets.flippable.html ; pp. 1-2.

* cited by examiner

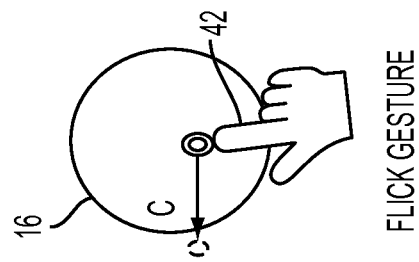
FIG. 7 FLICK GESTURE
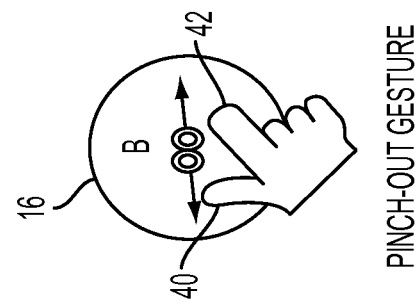
FIG. 6 PINCH-OUT GESTURE
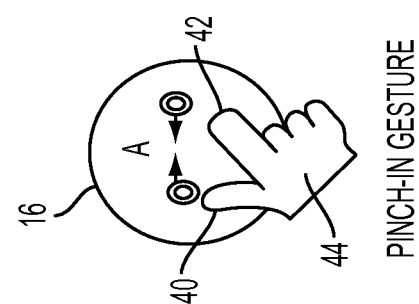
FIG. 5 PINCH-IN GESTURE

REVERSIBLE USER INTERFACE COMPONENT

BACKGROUND

The exemplary embodiment relates to tactile user interfaces and finds particular application in connection with a displayable user interface component ("a widget") having a plurality of virtual sides, whereby at any given time, only one side is displayed to the user on the user interface, and the other side or sides are hidden from view, each side being associated with a different functionality.

Multi-touch interactive systems using specific user-interface designs and capabilities allow users to navigate easily through interactive content on multi-touchscreens of interactive table computers, interactive windows, multi-touch tablet computers, and multi-touch tablet PCs, and smartphone devices, all of which are referred to herein as tactile user interfaces (TUIs). TUIs incorporate a display device and touch-screen which detects user hand or finger movements or movements of another implement with which a user contacts the screen, such as a stylus. The detected movements are translated into commands to be performed, in a similar manner to conventional user interfaces which employ keyboards, cursor control devices, and the like. Such tactile user interfaces can be used for manipulating graphic objects which can represent underlying documents, through finger or implement-guided movement of a widget, such as a virtual magnet.

However, translating the design of standard graphical user interfaces to multi-touch interactive devices is not always straightforward. This can lead to complex manipulations that the user may need to memorize in order to use the functionality provided by a touch-screen application. Additionally, hand movements often lack the precision which can be achieved with a keyboard and user fingers differ in size and shape, causing different touch signals to be sent from the touch-screen to the application.

When a user wishes to change functionality of the widget, this may be performed using a menu from which a user selects one of the functionalities. Such a menu is described, for example, in copending application Ser. No. 13/031,336 and in U.S. Pub 20100313124. As disclosed therein, the functionality of a displayed virtual magnet is changed by selecting from a menu displayed, for example, on a ring around the virtual magnet, with navigable sub-menus optionally being accessed from a main menu. The magnet can then be applied to the set of graphic objects where the new functionality of the magnet affects how the graphic objects respond to the magnet, based on underlying document properties.

One problem with such a widget is that on some user interfaces, such as smartphones, the menu options may be difficult to read, due to the small size of the screen. Selection of one of the menu options using touch gestures may also be difficult or time consuming, even on larger screens, when the number of options is fairly large or when navigation through a number of sub-menus is desired.

There remains a need for an apparatus and method employing a displayable widget which can be tuned with minimal touch gestures.

INCORPORATION BY REFERENCE

The following references, the disclosures of which are incorporated herein by reference, in their entireties, are mentioned.

U.S. application Ser. No. 13/031,336, filed Feb. 21, 2011, entitled QUERY GENERATION FROM DISPLAYED TEXT DOCUMENTS USING VIRTUAL MAGNETS, by Caroline Privault, et al.

U.S. Pub. No. 20100313124, published Dec. 9, 2010, entitled MANIPULATION OF DISPLAYED OBJECTS BY VIRTUAL MAGNETISM, by Caroline Privault, et al.

U.S. Pub. No. 20100312725, published Dec. 9, 2010, entitled SYSTEM AND METHOD FOR GUIDED DOCUMENT REVIEW, by Caroline Privault, et al.

U.S. application Ser. No. 12/976,196, filed on Dec. 22, 2010, entitled SYSTEM AND METHOD FOR COLLABORATIVE GRAPHICAL SEARCHING WITH TANGIBLE QUERY OBJECTS ON A MULTI-TOUCH TABLE, by Yves Hoppenot, et al.

U.S. Pub. No. 20110282892, published Nov. 17, 2011, entitled METHOD AND SYSTEM TO GUIDE FORMULATION OF QUESTIONS FOR DIGITAL INVESTIGATION ACTIVITIES, by Stefania Castellani, et al.

U.S. Pub. No. 20080168368, published Jul. 10, 2008, entitled DASHBOARDS, WIDGETS AND DEVICES, by John O. Louch, et al.

U.S. Pat. No. 7,984,384, published Jul. 19, 2011, entitled WEB VIEW LAYER FOR ACCESSING USER INTERFACE ELEMENTS, by Imran A. Chaudhri, et al.

U.S. Pub. No. 20090228824, published Sep. 10, 2009, entitled MULTIPLE DASHBOARDS, by Scott Forstall, et al.

U.S. Pub. No. 20090077501, published Mar. 19, 2009, entitled METHOD AND APPARATUS FOR SELECTING AN OBJECT WITHIN A USER INTERFACE BY PERFORMING A GESTURE, and U.S. Pub. No. 20090128505, published May 21, 2009, entitled LINK TARGET ACCURACY IN TOUCH-SCREEN MOBILE DEVICES BY LAYOUT ADJUSTMENT, by Kurt E. Partridge, et al.

U.S. Pub. No. 20090100343, published Apr. 16, 2009, entitled METHOD AND SYSTEM FOR MANAGING OBJECTS IN A DISPLAY ENVIRONMENT, by Gene M. Lee.

BRIEF DESCRIPTION

In accordance with one aspect of the exemplary embodiment, a tactile user interface includes a touch sensitive display device. Memory stores instructions configured for displaying a widget and a set of graphic objects on the display device. The widget has a plurality of virtual sides, each of the sides being associated with a respective functionality. The widget is flipped, in response to a recognized touch gesture, from a first of the sides to a second of the sides, whereby the functionality of the widget is changed from a first functionality associated with the first side to a second functionality associated with the second side. The graphic objects are each associated, in memory, with a respective item having attributes. The graphic objects exhibit a response to the widget functionality of a currently displayed one of the sides of the widget based on the attributes.

In accordance with another aspect, a method for selection of a functionality for a widget displayed on a tactile user interface includes displaying a widget and a set of graphic objects contemporaneously on a display device of a tactile user interface, the widget having a plurality of virtual sides, each of the sides being associated with a respective functionality. The method further includes recognizing a touch gesture on the widget corresponding to a transformation of the widget from a first of the sides to a second of the sides and displaying the widget being flipped, in response to the recognized touch gesture, from the first of the sides to the second of the sides, whereby the functionality of the widget is changed from a first functionality associated with the first side to a second functionality associated with the second side.

In accordance with another aspect, a reconfigurable widget includes a first virtual side which is associated in memory of a computing device with a first functionality selected from a predetermined set of functionalities. Each of the functionalities is operable on displayed objects. The first functionality is actuated only when the first side is displayed on a touch sensitive display device and the second side is hidden from view. A second first virtual side of the widget is associated with a second functionality selected from the predetermined set of functionalities, the second functionality being actuated only when the second side is displayed on the display device and the first side is hidden from view. The widget is rotatable about an axis between the first and second sides in response to a recognized touch gesture on the display device.

BRIEF DESCRIPTION OF THE DRAWINGS

FIGS. 5-9 illustrate example widget setting gestures;

DETAILED DESCRIPTION

Figure 1:
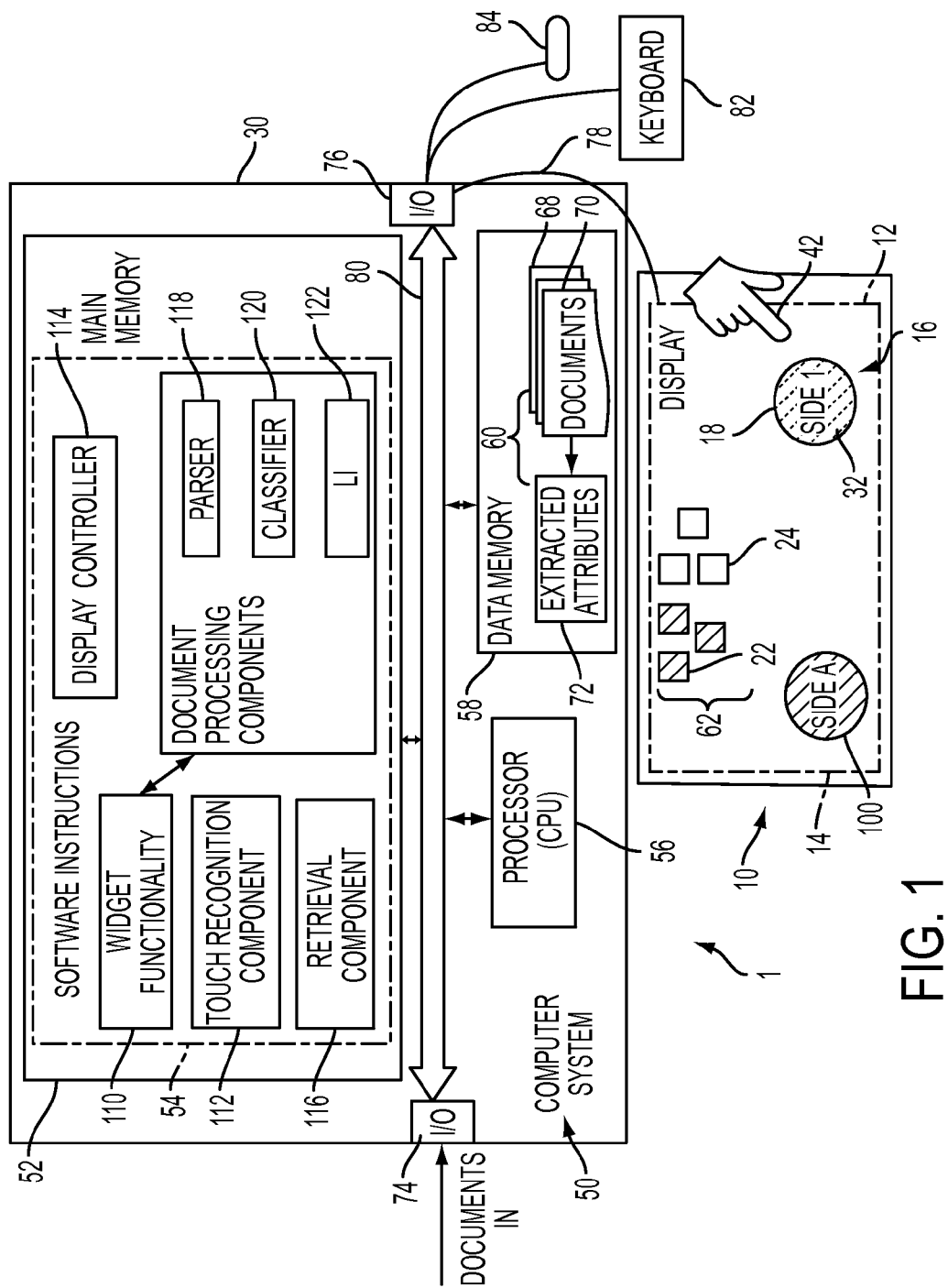
FIG. 1 is a functional block diagram of a tangible user interface in accordance with one aspect of the exemplary embodiment.

With reference to FIG. 1, a tactile user interface (TUI) 1 is shown. The TUI includes a display device 10, which includes a screen 12, such as an LCD screen, and a touch sensitive surface 14 overlying the screen, which together may be referred to as a touch-screen. Other touch-screen devices are also contemplated.

A widget 16 is displayed on the screen 12. The widget can have the appearance of an icon, such as a button, which is visible to a user of the TUI 1. The exemplary widget 16 includes an arrangement of colored pixels displayed on the screen 12. The widget 16 has a plurality of virtual sides 18, 20, etc. (see FIG. 2), each side being associated with a different functionality. Each of the widget's functionalities is operable on contemporaneously displayed graphic objects 22, 24, as described below. Only one of the functionalities is capable of being "ON" (operational) at any given time, which corresponds to the virtual side which is displayed on the screen ("side 1" in FIG. 1). One or more hidden (at least partially or completely obscured from view) virtual sides of the widget 16 have their functionalities "OFF". The virtual sides 18, 20 of the widget can thus together serve as a menu of options (functionalities), with a current chosen single one of the options being displayed to the user. In addition to being able to be translated between sides 18, 20, the widget 16 is moveable across the screen 12, by means of touch gestures.

The exemplary TUI 1 can be configured as for the TUI disclosed in above-mentioned application Ser. No. 13/031, 336 and/or Pub. No. 20100313124, incorporated herein by reference, except as noted. The user interacts with the TUI 1 primarily through finger contacts and gestures on the touch-sensitive touch-screen 12, 14. The interaction can be through one or more finger touches and/or through a large touch area in contact with the screen, such as single fist or hand palm, or any other object striking the screen, such as a stylus. The touch-screen 12, 14 and associated software detects the user contacts and translation of their positions on the screen 12 to associate them with the widget(s) 16 and commands.

The exemplary widget 16 provides users with an alternative method for menu selection to the usual menu navigation and selection methods. The exemplary system provides fluid and fast changing of widget functionality at any time during the course of a user session on the TUI with a small number of gestures. In addition, it is particularly suited for small touch-screen devices, such as smartphones, where the size of the widget 16 can be reduced, while at the same time providing more menu options. Widget setting on the exemplary multi-touch display device 10 is intuitive and easy to learn for the user. The user can switch comfortably from manipulation operations (on items displayed on the screen, e.g., sorting of photographic images or other documents) to widget setting operations without breaking off the task operation flow.

The exemplary widget 16 thus serves as a menu for its different functionalities (options), which eliminates the need for a conventional menu opening/closing mode, and enables the menu display itself to be dispensed with, by directly associating each virtual side 18, 20, etc. of the widget with a specific widget setting.

Figure 2:
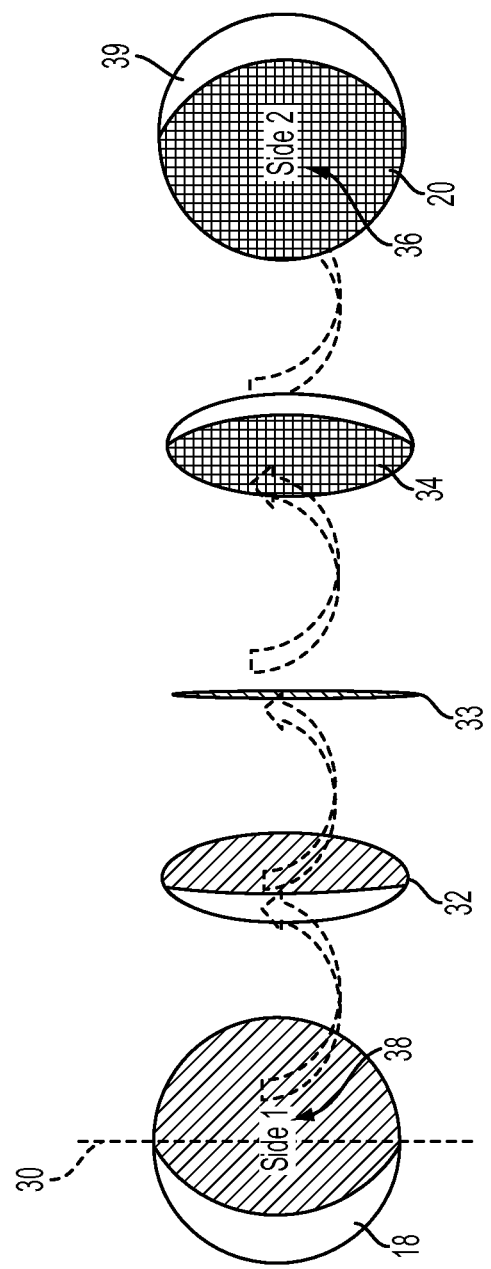
FIG. 2 illustrates widget setting in a first example embodiment.

In one embodiment, illustrated in FIG. 2, the widget 16 has a first functionality associated with a first virtual side 18 of the widget and a second functionality associated with a second virtual side 20 of the widget. When the first side 18 is ON (its functionality is active), only the first side is visible, while the second side 20 is hidden from view and OFF (its functionality is inactive). When the second side 20 is ON, only the second side is visible, while the first side 18 is hidden from view and OFF.

The reversible widget 16 shown in FIG. 2 has only two virtual sides 18, 20. The association between a side and a widget setting is then two-fold as it merges the setting selection-action with the display-layout of the widget setting itself. In other words, the widget always displays its current setting, and that display at the same time induces the setting. If the display changes (through rotation on itself) the setting changes as well.

Figure 3:
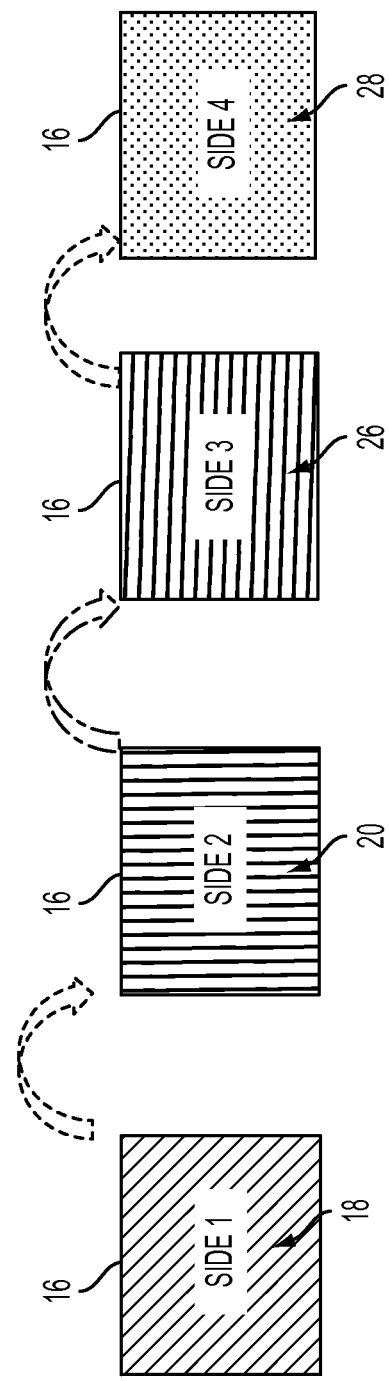
FIG. 3 illustrates widget setting in a second example embodiment.
Figure 4:
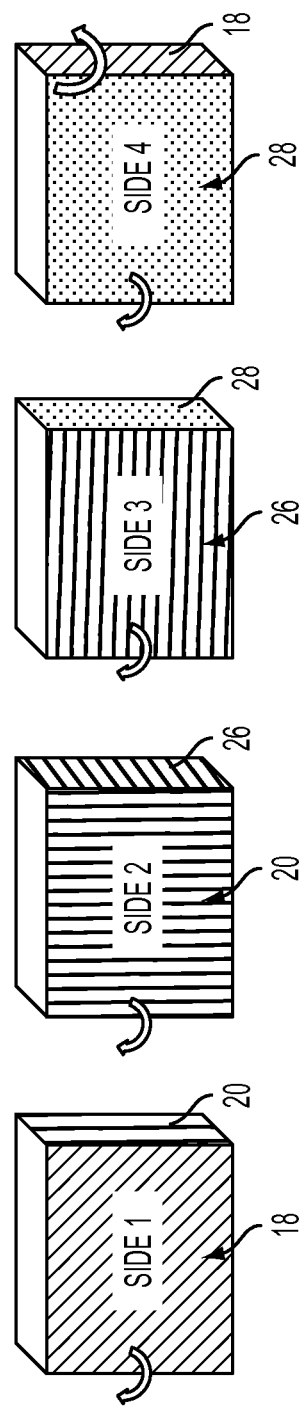
FIG. 4 illustrates widget setting in a third example embodiment.

In other embodiments, the widget has more than two virtual sides, such as three, four, five, or more virtual sides. Rather than a 2-choice menu implemented through a 2-sided widget, the widget can then be used to provide an N-choice menu, involving, in this case an N-side widget, as exemplified in FIGS. 3 and 4. In one embodiment, a vector of N states (or options) is associated with the widget 16 and managed as a loop, where N can be any predetermined finite number. The first rotation takes the user to the first widget option; the second one sets the widget to the second option, and so on until option N; and then the N+1 rotation brings the user back to the first possible setting. At any time, in the loop, a new rotation of the widget takes the user to the next option, or the $1^{st}$ one in the vector if the widget was on the Nth setting. For example, FIG. 3 illustrates a widget 16 with four sides: side 1, shown at 18, side 2 shown at 20, side 3 shown at 26, and side 4 shown at 28. Only one of these views is visible to the user at any given time. FIG. 4 illustrates another widget 16 with four sides: side 1, shown at 18, side 2 shown at 20, side 3 shown at 26, and side 4 shown at 28. In this embodiment, the widget 16 is displayed in perspective view, as a three dimensional object, but only the side which is uppermost is operational at any given time.

As for the widget of FIG. 2, at any given time, only one of the N sides 18, 20, 26, 28 of the widget (i.e., those sides that are capable of having an associated operational functionality), is displayed to the user on the user interface, and all the other sides having an associated (inoperative) functionality are hidden from view (invisible or at least partly occluded). In some embodiments, every virtual side 18, 20, 26, 28 of the widget is associated with a respective functionality.

The widget 16 can have any suitable shape, irrespective of the number of virtual sides 18, 20, etc. that it has. Example shapes include a circle, triangle, square, disk, or other multi-sided polygon, polyhedron, or three dimensional object, or even an irregular shape. Thus, a widget 16 which is circular in shape can have two, three, four, or more virtual sides. In some embodiments, the widget assumes a shape, e.g., with a number of edges in its perimeter, that indicates how many virtual sides it has. For example, the widget may be a polygon with six edges (hexagon) in the case of a six-sided widget. In practice, the number of virtual sides that the widget may have may be up to a maximum of about 10.

The widget 16 is translated (flipped) between its two (or more) sides by a natural touch gesture on the touch-screen. In flipping a circular disk shown in FIG. 2, for example, the height of the widget 16 along its vertical axis 30 remains constant while the width of the first displayed side decreases to a point on a thin vertical line and the width of the second side then increases to its full width. As an example, the widget 16 is rotatable about its axis 30 from the first side 18 plan view to an intermediate position 32, where side 1 is still partially visible but not operational, and then to a second intermediate position 33, where neither side is visible, just the widget's perimeter, then to a third intermediate position 34, where side 2 is partially visible but not operational, and finally to the side 2 plan view at 20. From the second position 20, continued rotation in the same direction returns the widget to the first position 18. In some embodiments, rotation in a reverse direction also brings the widget back to the first position. This is useful in the widget of FIG. 3, for example, where the widget has more than 2 sides, since the rotation direction can be selected to bring the widget to the desired side with the fewest number of gestures.

In one embodiment, the flipping action may be graphically shown to provide visual feedback of the action. For example, the widget assumes a sequence of intermediate positions between the first and second (or more) sides, e.g., as an animation, similar to a video of a coin being flipped over. As will be appreciated, the three intermediate positions shown in FIG. 2 are only exemplary of the possible intermediate positions. In other embodiments, the widget 16 may be displayed as flipping directly between sides without visualizing any intermediate positions.

To choose between the two (or more) settings of the widget, the user operates a rotation (flipping) of the widget graphic object on the screen to make it revolve on its axis 30 parallel to the screen plane, virtually rotating the widget through 180°. In this movement, the widget does not move in a 2D space, i.e., there is no change in coordinates of the widget on the screen. Rather, there is only a change of the appearance of the widget at the same location. The widget then exposes the new side that was not visible before the rotation. The new side visible after the rotation completed displays a widget option 36 that indicates the current widget functionality setting. A subsequent rotation triggered by the user on the widget causes the widget to flip again and the widget to switch to the first or another option 38, which is displayed. In the embodiment of FIG. 2, the two sides 18, 20 are opposed, as in a coin, and the flipping of the widget graphically illustrates the flipping of a coin. The same graphics can also be used for a multi-sided (more than two-sided) widget.

The entire perimeter 39 of the exemplary widget 16 has the same functionality which depends on the side displayed, i.e., there is no "north" and "south" region of the perimeter (as in magnets disclosed in application Ser. No. 13/031,336 and Pub. No. 20100313124), although such an embodiment is also contemplated. Thus a graphic object 22, 24 can respond to the functionality of the widget 16 irrespective of where it is angularly positioned, be it above, below, left, or right of the widget on the screen.

Various touch gestures are contemplated for effecting the translation ("flipping") of the widget between sides. FIGS. 5 to 9 show example gestures, each using one or more of the fingers 40, 42 of one of the user's hands 44. The gesture shown in FIG. 5 is referred to as a pinch-in gesture, indicate by arrows A. The pinch-in gesture is initiated by bringing a thumb 40 and index finger 42 into contact with a target element (the widget 16 in this case) a small distance apart, then bringing the thumb and index finger together, thumb and index finger then simultaneously lifting off the screen immediately thereafter.

The gesture shown in FIG. 6 is referred to as a pinch-out gesture, indicated by arrows B, and is essentially the reverse of the pinch-in gesture. The thumb 40 and index finger 42 both come into contact with the widget at the same point on the screen, then move apart, and then are lifted simultaneously away from the screen.

The gesture shown in FIG. 7 is referred to as a flick gesture, indicated by arrow C. This gesture can be a flick-left gesture, such as a quick movement of a user's finger that makes initial contact with the screen, (on the widget), brushes the finger in a specific direction (left in this case), and then lifts off the screen. A flick-right gesture can be the reverse of that shown.

Figure 8:
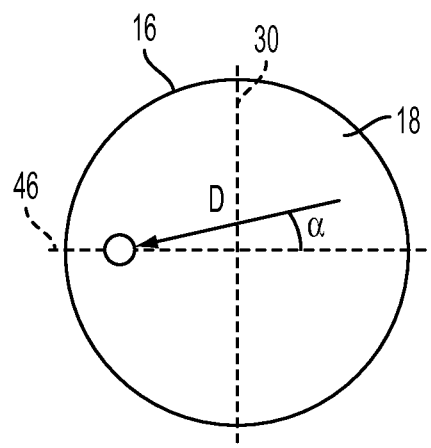
Figure 9:
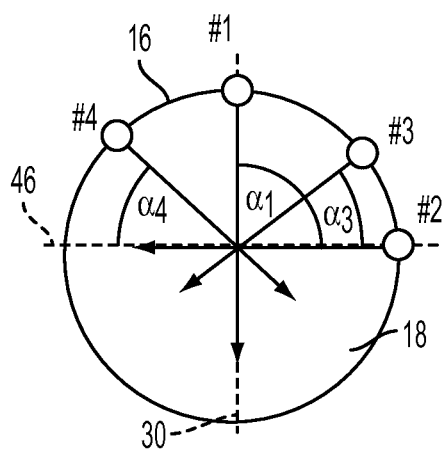

In the embodiment shown in FIG. 8, a user applies a gesture on the widget 16, indicated by arrow D, whose angle α and/or direction, with respect to a reference axis 46, determines to which side the widget is to be rotated. The reference axis 46 of the widget may be defined as being perpendicular to the rotation axis 30, for convenience. As shown in FIG. 9, each of a plurality of sides can be associated with a different angle α and direction. A flick at the specific angle can thus be associated with a specific widget side and a corresponding functionality. For example, the four sided widget shown in FIG. 9 is associated with four gestures, one for each of the virtual sides. Rotating the widget through a flip gesture at angle $\alpha_Y$ flips the widget directly to side Y and hence sets the widget with option Y, without the need for displaying all the sides in between. In the embodiments of FIGS. 8 and 9, the vertical axis is maintained as the pivot axis 30 for the rotation, but the angle α of the flicking gesture is recorded with respect to the horizontal axis 46.

In FIG. 9, each of the flicking actions begins in the same semicircle of the widget 16 in order to allow a greater control of gesture detection and a more comfortable operation for the user. Additionally, the number of gestures may be limited to about four of the easiest angles to draw. These gestures are each associated with one of the four virtual sides of a widget 16 for modeling 4-choice menus. As examples, the four gestures shown are:

1: vertical flick top-down,
 2: horizontal flick right-left,
 3: 45° angle, flick right-left,
 4: 45° angle, flick left-right.

Gesture 1 rotates the widget to side 1 displaying option 1; gesture 2 rotates the widget to side 2 displaying option 2, and so forth.

An advantage of such a system is that it avoids having to go through the m options of a menu before being able to reach the m+1 desired option. The appropriate gesture takes the widget directly to the desired setting out of the four possible ones of this widget. Thus, for example, a single gesture at angle $\alpha_3$, when the widget is displaying side 1, flips the widget directly to side 3.

Other gestures are also contemplated, such as a single tap, briefly touching the surface of the screen with the fingertip over the widget, which triggers one rotation. For an N-sided widget, the number of taps may designate the side to be displayed: 1 tap for side 1, two taps for side 2, and so forth . . . . A single tap may also be used for rotating the magnet from side (option) m to side (option) m+1. Alternatively, to avoid the need for multiple taps, a "flashing" or "folding" mode may be employed, where the first user's tap or flick on the widget triggers a rotation, which does not stop on the next widget side but continues to slowly rotate through the possible sides, displaying one side after the other, until the user operates a second contact, such as a tap on the screen, to stop the widget rotation on the desired side and option.

It may be noted that, in general, the pinch gesture requires a sufficient space, and generally a sufficiently large widget surface, to be comfortably operated by the user and accurately detected by the TUI. Therefore, it may not be the best suited gesture for small screens, such as smartphones screens. There, the single tap (or plural tap) may be a more accurately recognized gesture to trigger the rotation. The flick gesture generally can fit on both large and small screens. In addition, it offers extra possibilities in that many devices allow not only recognizing the flicking gesture with initial and final contact point coordinates but also capturing the angle at which the flick is operated, as in the embodiments of FIGS. 8 and 9.

The widget flipping action is thus associated with a specific gesture that is both natural for the user and accurately recognizable by the system.

In the illustrated embodiments, only one-hand gestures are used to operate the widget rotation. However, it is to be appreciated that the design could also allow users to exploit both hands to operate the widget settings.

Once the user is satisfied that the currently displayed side of the widget is the one the user wishes to select, a confirming gesture, such as one or two taps on the center of the widget, may be employed to activate the widget with that functionality. Alternatively, the widget may adopt the functionality of the currently displayed side without further confirmation, once the rotation is complete.

As illustrated in FIG. 1, the exemplary TUI 1 includes a computer system 50 communicatively connected with the display device 10. The computer system 50 includes main memory 52 which stores instructions 54 for performing the method disclosed herein and a processor 56, in communication with the main memory 52, for executing the instructions, as well as controlling other operations of the TUI 1.

Data memory 58 stores information 60 relating to a set 62 of the graphic objects 22, 24, etc., displayed on the screen. In one embodiment, each displayed graphic object 22, 24, represents a respective item, such as a document 68, 70 stored in local memory 58 or accessible in remote memory. A document, as used herein, can be a text document, an image (e.g., a graphical or photographic image), a combination thereof, or the like. The information 60 may include the digital documents 68, 70 themselves, and/or information extracted therefrom, referred to herein as document attributes 72. Data memory 58 may be resident in the computer system 50 or remote from the apparatus 1 and communicatively connected therewith. Each graphic object 22, 24, etc. comprises an arrangement of pixels, such as an icon, a thumbnail image of the respective document 68, 70, or the like.

The computer system 50 includes one or more input/output devices 74, 76, for communicating with external devices. For example, digital documents 68, 70 are received via an input/output device 74. The display device 10 is linked to a second input/output device 76 by a link 78, such as a wired or wireless link, for communicating signals from the touch-screen 14 to the computer system 50 and for receiving signals from the computer system which cause the display 12 to change the visualization. Components of the computer system 50 may communicate via a data control bus 80. While not required, the apparatus 1 may further include one or more additional user input devices, such as a keyboard or keypad 82, a cursor control device 84, or the like, integral with or separate from the display device.

The computer system 50 may be a dedicated computing device which is mounted to or otherwise proximate to the display device, or may be PC, such as a desktop, a laptop, palmtop computer, portable digital assistant (PDA), server computer, cellular telephone, tablet computer, pager, combination thereof, or other computing device(s) capable of executing instructions for performing the exemplary method.

The memory 52, 58 may be separate or combined and may represent any type of non-transitory computer readable medium such as random access memory (RAM), read only memory (ROM), magnetic disk or tape, optical disk, flash memory, or holographic memory. In one embodiment, the memory 52, 58 comprises a combination of random access memory and read only memory. In some embodiments, the processor 56 and memory 52 and/or 58 may be combined in a single chip. The interface 74 and/or 76 allows the computer to communicate with other devices via a computer network, such as a local area network (LAN) or wide area network (WAN), or the internet, and may comprise a modulator/demodulator (MODEM), USB port, or the like. Memory 52 stores instructions for performing the exemplary method shown in FIG. 10 as well as the processed data.

The digital processor 56 can be variously embodied, such as by a single-core processor, a dual-core processor (or more generally by a multiple-core processor), a digital processor and cooperating math coprocessor, a digital controller, or the like. The digital processor 56, in addition to controlling the operation of the computer system 50, executes instructions stored in memory 52 for performing the method outlined in FIG. 10.

The exemplary display device 10 can include an LCD or plasma screen, computer monitor, smartphone screen, or the like, which may be capable of displaying in color. The touch-screen 14 is integral with or overlaid over the display screen 12 and includes multiple actuable areas which are independently responsive to touch or close proximity of an object (touch-sensitive). The actuable areas may be pressure sensitive, heat sensitive, and/or motion sensitive. The actuable areas may form an array or invisible grid of beams across the touch-screen 14 such that touch contact within different areas of the screen may be associated with different operations.

Exemplary touch-sensitive screen devices 10 which allow finger-touch interaction, which may be used herein, include the Multi-Touch $G^2$-Touch-screen or $G^3$-Touch Screen from PQ Labs, California (see http://multi-touch-screen.net), an infra-red grid system, such as the iTable from PQ Labs, a camera-based system, such as Microsoft Surface™ touch-screen table (http://www.microsoft.com/surface/). On this type of large touch-screen, which may have a height and/or width greater than the maximum dimension of an item (e.g., a screen measuring about 80 cm or greater on the diagonal), a large number of digital objects can be displayed and manipulated by one or more users through natural gestures. However, it is also contemplated that the display device may have a smaller screen, e.g., the size of a mobile phone screen, which may display fewer than all the graphic objects at one time (or all of them in reduced size), and provide for viewing a selected portion of one of the documents on the screen. As will be appreciated, where the finger or implement is detected by a camera rather than through pressure, "detecting a touch contact," and similar language, implies detecting a finger or other implement on or near to the screen, which need not necessarily be in physical contact with the screen.

A variety of different functionalities can be associated with the widget 16. In the embodiment shown in FIG. 1, for example, each graphic object 22, 24 represents an underlying digital document 68, 70, etc., stored in memory 58. Attributes 72 extracted from each document 68, 70 cause the graphic object 22, 24 representing the respective document to respond to the widget in accordance with the current functionality of the widget, e.g., by moving relative to the widget.

The attributes 72 may be related to textual content of the document (e.g., presence/absence of certain keyword(s), co-occurrence of certain keyword(s), frequency of occurrence of certain keywords, etc.); image content of the document (e.g., presence/absence of images, semantic content of images present, etc.); document type (e.g., email, Word document, spreadsheet, PowerPoint presentation, etc.); document size (e.g., small, medium, large); date of the document (e.g., before a certain date/after a certain date, within a certain data range); or a combination thereof.

In some embodiments, the documents 68, 70 are text documents and may each comprise a body of searchable text. The documents, in some cases, may be a subpart of a larger document and/or which may also include other information, such as drawings, photographs, and the like. In general, a text document comprises one or more text strings expressed in a natural language, such as English or French, and having a vocabulary and a grammar. Each text string of the document can be as short as a phrase or clause of a sentence and generally comprises a sentence and may comprise two or more contiguous sentences. A text document generally includes a plurality of such text strings. Each text string may include a plurality of text elements, such as words, phrases, numbers, and dates, or combinations thereof. Exemplary text documents include word documents, spreadsheets, PDF files, scanned documents which have been OCR processed to extract text, web pages, XML files, and the like. In the case of input XML documents and web pages, the searchable text strings may include hidden text.

For example, side 1 of the widget 16 may be associated, in memory 56, with a functionality which is selective for documents 68 which are responsive to a first query, e.g., which include a first keyword. Side 2 may be associated, in memory, with a functionality which is selective for documents 70 which are responsive to a second query, e.g., which include a second keyword, or which are not responsive to the first query (i.e., which do not include the first keyword). When the first side 18 is displayed, graphic objects 22 representing documents 68 with an attribute 72 that is responsive to the first query (e.g., the document includes one or more words corresponding to the first keyword), respond to the widget. By "respond," it is meant that the graphic objects, or at least some of them, move across the screen, e.g., towards or away from the widget. The keyword search may be applied to the displayable text of the document, to metadata of the document, or to a combination thereof.

The actuated widget 16 can be moved across the screen 12 using a finger touch to position the widget close to a specific group of graphic objects 22, 24 displayed on the screen that are of interest to the user. In reaction to the widget movement/position on the screen, some graphic objects may be attracted around the widget. For example, graphic objects 22 having the attribute 72 corresponding the actuated side of the widget respond by moving towards the widget 16, while graphic objects 24 representing documents 70 without the attribute 72 corresponding to the query respond in a different way, for example, remaining stationary or moving away from the widget. The attracted objects 22 may correspond to documents evaluated as "relevant to a certain category", or they can represent documents containing some specific keywords, and so on, depending on the functions and algorithms associated with the widget or widgets.

Figure 11:
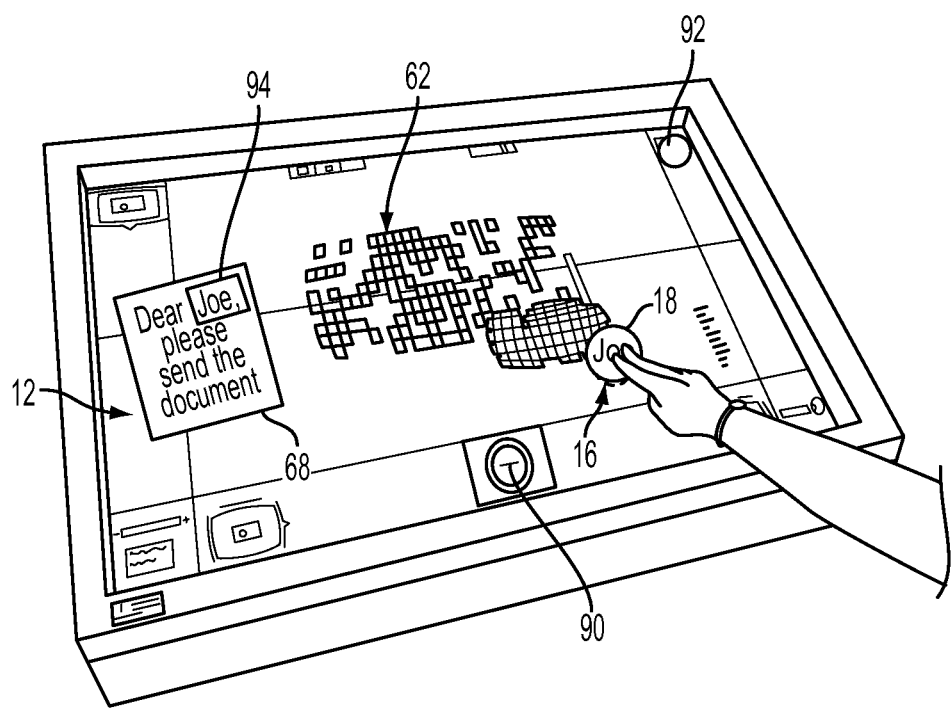
FIG. 11 illustrates an example user interface.

The collection 62 of graphic objects can be initially displayed on the touch-screen in various icon arrangements, such as tiles, clouds, icons, or lines, etc. FIG. 11 illustrates a cloud arrangement. The widget 16 may have a home position 90 in which it is inactive, but remains visible on the screen. When moved off the home position, the widget 16 may automatically assume the functionality of the displayed side 18. Alternatively or additionally, a widget 16 may be called into view by pressing a button 92 on the screen, which causes the widget to be displayed. Once a functionality has been selected, the activated widget 16 can be moved close to a set of graphic objects, where it can attract or otherwise cause a responsive movement by some of graphic objects (which correspond to the documents meeting the selected functionality of the widget).

The different retrieval functions that the widget 16 can be associated with may include one or more of:

1) Document filtering, e.g., any rule that enables documents to be filtered out, for example, through predefined keyword-based searching rules;

2) Document similarity, e.g., any algorithm capable of identifying a degree of similarity between a predefined sample document and any other document, based on its content;

3) Document classification, e.g., any automatic classifier implemented through an algorithm which is able to associate a predefined label to a document, based on its textual and/or visual content;

4) Document clustering, e.g., any algorithm which groups documents, based on similarity of their attributes (e.g., textual content), into a predetermined number of groups.

As an example, a user may use the widget 16 for forming clusters of displayed graphic objects, for example, by positioning the widget 16 near the set 62 of graphic objects. Those graphic objects whose underlying documents have an attribute responsive to the query group around the widget to form a first cluster, while the remaining graphic objects (or at least some of them) form a second cluster by grouping themselves together further from the widget or by remaining in place. The user can touch a selected one of the graphic objects which causes the underlying document 68, 70 to be displayed on the screen. A clustering application is discussed in further detail below.

In the embodiments illustrated in FIGS. 2-4, the sides are denoted side 1, side 2, etc., but in practice, any textual representation 36, 38 of the functionality of the side, and/or other representation of the widget functionality, may be displayed.

For example, if side 1 corresponds to a keyword query, the keyword may be displayed on that side. Or, if one side denotes "relevant", based on some function of attributes 72 of the documents, the side may display the word "relevant." The other side could display the word "non-relevant." Other ways of distinguishing the sides from each other and/or for representing their functionalities are also contemplated, such as through color, texture, display of an image, or the like.

In some embodiments, the widget 16 is applied to a single document 68, 70 that is displayed on the screen, rather than to a group of graphic objects 22, 24, etc. representing a collection of documents. In this embodiment, the widget is selective for instances within the displayed document 68, 70 that match the current functionality of the widget, e.g., which are responsive to a query, such a keyword. For example, one side 18 of the widget is associated with a functionality which is selective for instances of a first keyword (e.g., "Joe" in the FIG. 11 illustration) when the document is open. This side 18 may also be selective for graphic objects representing documents which include the first keyword when only the graphic objects are displayed. The instances 94 of the keyword may be highlighted or otherwise identified in the open document 68. The exemplary widget 16 thus finds application for document categorization and retrieval as well as for information extraction.

Two or more of the multi-sided widgets 16 can be employed to provide different functionality combinations. For example, as shown in FIG. 1, two widgets 16, 100 may displayed on the screen 12, each one having a choice of functionalities.

With continued reference to FIG. 1, to enable users to interact easily with document sets, the computer system 50 includes various software components 10, 112, 114, 116, 118, 120, 122 stored in memory 52, which are implemented by the processor 56. These may include a widget functionality component 110, which implements algorithms and retrieval rules that may be preconfigured by the system and/or the user, for implementing the predefined user's gestures on the widget, described above. The widget functionality component 110 receives signals from a touch recognition system 112 and supplies control signals to a display controller 114 for controlling the widget 16, graphic objects 22, 24, and related functions in response to the touch signals. The configuration of the widget(s) 16, 100 may be achieved through prior user input uploaded by the system at the beginning of the application session, such as by parsing a configuration file or by keyboard input. The configuration setting of a widget may either be fully static (e.g., a fixed filtering threshold can be recorded into a widget whose role is to measure the similarity with a specific document or image); or it may be made dynamic through conventional menu selections.

The graphics for the widget flipping action can be implemented, for example, using suitable software, such as the PyMT: Python Multi-touch library (see: http://pymt.eu/docs/api/api-pymt.ui.widgets.flippable.html). PyMT is an open source library released under the terms of the GNU LGPL, for developing cross-platform multi-touch applications (Linux/OSX/Win).

The touch recognition component 112 receives electrical signals and/or software information comprising touch coordinates from the touch-screen 14 of the display device 10 in response to user touches. In particular, user touches on the screen (or proximate to it) are converted by the display device to electrical signals which are interpreted by the touch recognition component 112 as corresponding to one of the predefined gestures (or not, if there is insufficient similarity between the detected touches and the predefined gesture).

The touch recognition component 112 may include or access a gesture recognition library which stores gestures and their corresponding meaning.

The display controller 114 controls the rendering of the widget 16 and controls the other content of the display, such as graphic objects 22, 24, and documents 68, 70 on the display, based on the detected gestures and other information. The touch-screen device may come preloaded with a component that provides the touch coordinates of every contact point on the screen, and/or a library with an API that is capable of recognizing some basic and common gestures from a set of touch coordinates.

A retrieval component 116 is configured for retrieving an underlying document 68, 70, corresponding to a displayed graphic object 22, 24, which a user wishes to open on the screen 12.

The system 50 may include one or more document processing components 118, 120, 122 for extracting document attributes 72 and/or to determine whether a document 68, 70 is responsive to a query. Some of these components may function as described, for example, in application Ser. No. 13/031,336 and/or Pub. No. 20100313124. The document processing components 118, 120, 122 may include, for example, one or more of a natural language processing component 118, a classifier 120, and a language identifier 122. As will be appreciated, the document processing components can be called remotely from a distant server receiving requests from the system 50 after user gesture recognition and do not need to be stored local to the TUI.

The natural language processing component 118 may include a parser for parsing text of the documents 68, 70 to identify words and their morphological properties (noun, verb, etc.), for named entity recognition, and optionally for extracting syntactic relations between words or phrases in a sentence (e.g., between a subject and its main verb, between a verb and its object, etc.), by applying a set of grammar rules, as described for example in U.S. Pat. No. 7,058,567, entitled NATURAL LANGUAGE PARSER, by Salah Aït-Mokhtar, et al., the disclosure of which is incorporated herein by reference. The parsed text may be used for querying or as input for other functionalities, such a language guessing, classifying, and document clustering.

The classifier 120 may have been trained to assign a document to one of a set of two or more classes, based on its content e.g., based on the occurrence or frequency of occurrence of each of a set of one, two, or more words. Such a classifier may have been trained with a set of training documents that are each labeled with a category label selected from a finite set of labels corresponding to the categories.

The language identifier (LI) 122 may include a set of rules for language identification (a language guesser) as disclosed, for example, in G. Grefenstette, "Comparing Two Language Identification Schemes", in Proc. 3rd Intern'l Conf. on the Statistical Analysis of Textual Data, JADT'95, December 1995, Rome, Italy; U.S. Pat. No. 5,062,143, issued Oct. 29, 1991, entitled TRIGRAM-BASED METHOD OF LANGUAGE IDENTIFICATION, by John C. Schmitt; and Jean-Pierre Chanod and Pasi Tapanainen, "Tagging French text: tagset, dedicated lexicons and guesser," Proc. From Texts To Tags: Issues In Multilingual Language Analysis, EACL SIGDAT workshop, Dublin (1995), the disclosures of which are incorporated herein by reference. In an exemplary embodiment, the language guesser includes rules designed to identify at least two languages and the widget functionality is such that a first side of the widget is selective for documents which are predicted to be in a first of the languages and a second side of the widget is selective for documents which are predicted to be in a second of the languages. For example, when the first side 18 is active, English language documents (those with at least a threshold probability of being in English, according to the LI component) may be separated out from the other documents while when a different side 20 is displayed, French language documents are separated out.

The initial setting of the widget determines which of these document processing components 118, 120, 122 is used to implement the widget functionalities that are available to the user by flipping the widget. Multiple widgets may be provided which have different ones of these functionalities.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 1 is a high level functional block diagram of only a portion of the components which are incorporated into a tactile user interface 1. Since the configuration and operation of programmable computers are well known, they will not be described further.

Figure 10:
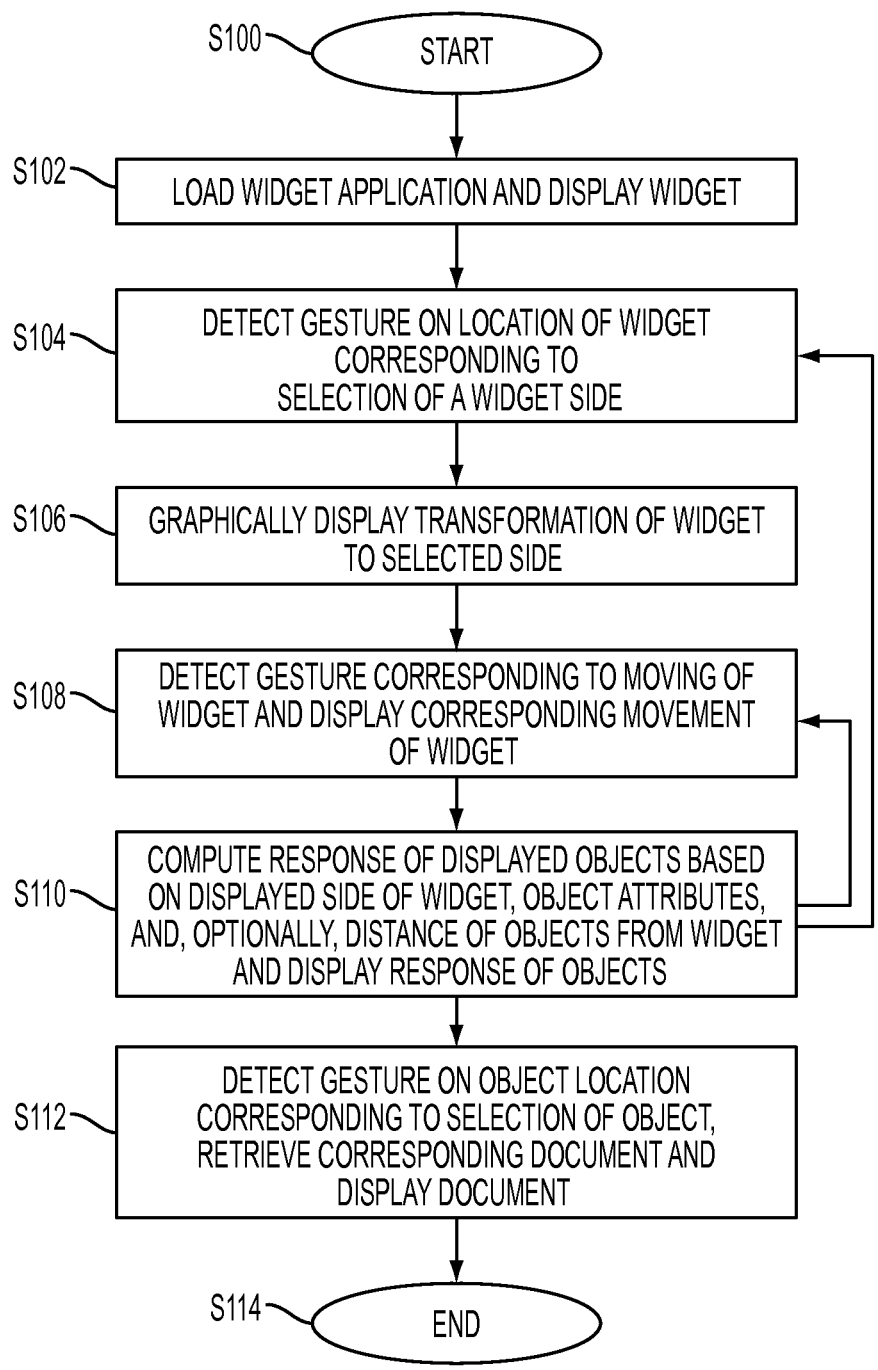
FIG. 10 illustrates a method of use of a widget in accordance with another aspect of the exemplary embodiment.

FIG. 10 briefly illustrates an exemplary method for using the widget 16. The method starts at S100. It is assumed that a user interface 1 is provided with appropriate software 54 stored in memory.

At S102, when a user wishes to make use of the widget functionality, the widget application software 110 is loaded and a widget 16 is automatically displayed on the screen, or can be called up by the user using the widget button 92. By way of example, the welcome screen of the application provides a number of magnets that are displayed on the screen for different applications, such as keyword filtering, clustering, and so forth. An indication of the type of functionality they can each provide, e.g., a short textual description, may be displayed on top of each inactive magnet. In some embodiments, the user may use a conventional menu for selecting functionalities for populating each of the sides 18, 20, etc., if this has not already been set. When activated (or also when inactive) the displayed virtual side 18 shows a representation 36 of its functionality.

With a widget 16 displayed on the screen, a predetermined touch gesture (such as one of those shown in FIGS. 4-9) on the widget location (e.g., one or more finger movements directly on top of the displayed widget 16), corresponding, in memory, to a request for a change in the functionality of the widget, is detected by the system (S104).

At S106, the corresponding transformation of the widget between sides 18, 20 is graphically displayed, e.g., as an animation, and a representation 38 of the functionality associated with the selected virtual side 20 is displayed at the end of the transformation. The system 50 may wait for a confirming gesture by the user to actuate the widget 16 with the functionality of the displayed side or may do so automatically. The current side setting is stored in memory.

At S108, a predetermined touch gesture corresponding to the movement of the widget is detected by the touch recognition component 112 and a graphic animation of the moving widget is generated by the widget functionality 110 and displayed on the display device by the display controller 114.

At S110, when the widget 16 is active to elicit a response in the graphic objects, e.g., positioned by finger touch within a predetermined distance of the graphic objects 22, 24 or otherwise positioned closer to the graphic objects, this causes the graphic objects to exhibit a response. The response of each of the graphic objects to the current functionality of the widget is computed. This may be performed by the widget functionality 110, optionally in cooperation with one or more of the document processing component(s) 118, 120, 122 and/or based on the stored attributes 72. The corresponding response, e.g., movement, relative to the widget, of some or all of the graphic objects, is displayed. Since the exemplary widget functionality is the same around the entire perimeter 39 of the widget 16, the widget elicits the same response from a graphic object (moving towards the widget, moving away from the widget, moving to a cluster, or staying put), irrespective of the object's initial angular position, relative to the widget, on the display screen 12. In some embodiments, the widget may have a predefined action perimeter, which limits the graphic objects on which elicits a response to those within a predefined radius or other predefined area.

At any time, the user may use the widget setting gesture to select a different side of the widget (a return to S104), and the surrounding graphic objects respond accordingly.

At S112, an item 68, 70 corresponding to one of the displayed graphic objects may be called up onto the display by a user, for example, with a touch gesture on the corresponding graphic object 22, 24. The widget 16 can then act on the displayed document itself, based on the functionality of its current side.

The method ends at S114.

The method illustrated in FIG. 10 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 10, can be used to implement the method for using a widget.

Example uses of the widget 16 will now be described.

Binary Categorizer

In one embodiment, the 2-sided widget serves as a binary categorizer: the widget itself is pre-configured to operate the probabilistic classifier 120 which can segregate documents into two distinct categories. The user can move the widget 16 toward a set of objects in order to pull out, from the set, the objects representing documents from one particular category or from the other. Each side of the widget is associated with a respective category, which can be represented, for example, through two colors, such as red and blue.

Rotating the widget to cause the blue face to be displayed will set the widget with a capability of attracting all documents having a "high" probability (according to a predetermined threshold) of belonging to the blue category. Further flipping the widget will immediately result in a widget capable of attracting all documents having a "high" probability (according to a predetermined threshold) of belonging to the red category.

This ability is fully contextual and does not break off the interaction flow in a disturbing way: the user does not need to move or change position to reach a different place on the screen for setting the magnet widget on the chosen or desired functionality. If the widget is currently over a specific set of objects, it can be flipped at its current position to switch from one functionality to another, without further interrupting the user task operation flow, without changing the widget size (e.g., to open a functionality selection menu) or hiding the data underneath through a menu display. In addition, the objects' reaction to a category switch can be made immediately visible to the user (for instance new objects are attracted) without further moves or actions on the widget.

This property applies to the binary classifier widget as well as to any other reversible widget in general. The same functionality can be extended to an N-choice menu, involving in this case an N-sided widget.

N-category Classifier Widget

In this embodiment, the widget is associated with a classifier 120 modeling N categories, and a classification algorithm. Each side of the widget corresponds to a category out of the N categories supported by the classifier model and algorithm. The classifier 120 can include a set of binary classifiers, one for each virtual side (displayed class vs. rest). A widget currently set on its "Category 1" side and moved towards a set of objects (documents) will attract all documents having a high probability of belonging to Category 1 (for example, according to a certain threshold). In other embodiments, a single multi-class classifier, modeling all the N categories together, may be employed. Then, if a category m is visible on the widget top side, the classification algorithm is launched on all target documents corresponding to graphic objects within the widget's action perimeter. All these documents are classified by the classifier against all the N modeled categories. Then, the document scores against the category m alone are considered for each document. Specifically, the value is compared to a threshold (that may be specific to the category m within the classifier mode), and if the probability score meets, e.g., is at or above the threshold, the corresponding graphic object exhibits a response to the widget set on category m. Flipping the widget placed over the same collection of objects (documents), up to another side/category will help pulling out objects (documents) from another category, and so on. In yet another embodiment, the side/categories may simply represent keywords and the classification algorithm 120 is simply a string matching algorithm, detecting documents holding some particular keywords.

Language Identifier

In this embodiment, the widget 16 is associated with a language detection/identification system (LI) 122, such as an algorithm stored in memory 54. Each virtual side 18, 20, etc. of the widget corresponds to a specific language within the set of languages that are supported for detection by the LI system. A widget currently set on its "Spanish" side and moved towards a set of graphic objects will attract all of the graphic objects representing documents having a high probability of being in Spanish (for example, according to a certain predetermined threshold). Flipping the widget placed over the same collection of documents, to associate the widget with another language will help pulling out objects representing documents in another language, and so on.

Tuning Widget Operating Mode:

In Pub. No. 20100313124, the magnet widgets, by default, attract documents matching the search or retrieval criteria implemented by the widget. The widget's operation mode could be the same or opposite, repelling the documents matching the criteria. To provide the user with the choice, the widget behavior may be tunable to select one of these response criteria as its functionality. This can be implemented through a 2-side widget, where one virtual side of the widget sets the widget in its attracting mode; the other side sets the widget in the repelling mode. The user can flip to one or the other at any time.

Case Sensitivity for Keyword Search

In this embodiment, the widget 16 is associated with a keyword search algorithm, (see for example, Pub. No. 20100313124). The widget serves to retrieve documents holding a particular keyword. The selection of the particular keyword can be statically pre-configured through the parsing of a system configuration file, or it can be dynamically set in the course of the task operation flow through an on-screen selection (e.g., as described in application Ser. No. 13/031, 336).

A more advanced tuning of the search algorithm may allow control of the case sensitivity of the search. This may be implemented through a 2-sided widget 16: one virtual side 18 of the widget makes the query case-sensitive and the other 20 makes it non-case-sensitive. When the widget is placed over a collection of graphic objects displayed on the touch-screen, flipping the widget over that set helps the user visualize the volume of items matching the query in a case or non-case sensitive mode. If the user initially choses the mode which is case-sensitive, but the search does not retrieve any objects, the extension of the search to a non-case sensitive matching is immediately available to the user.

Clustering Widget

Figure 12:
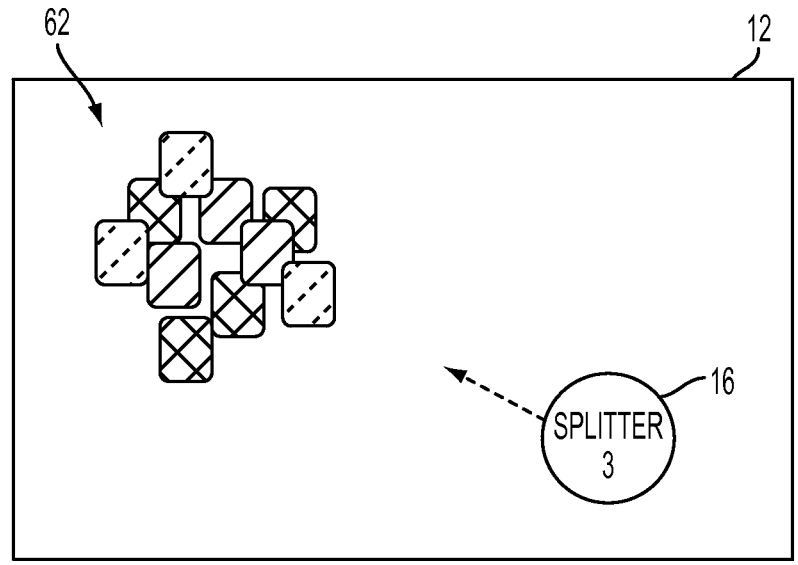
FIGS. 12 and 13 illustrate the use of an actuated widget for clustering.
Figure 13:
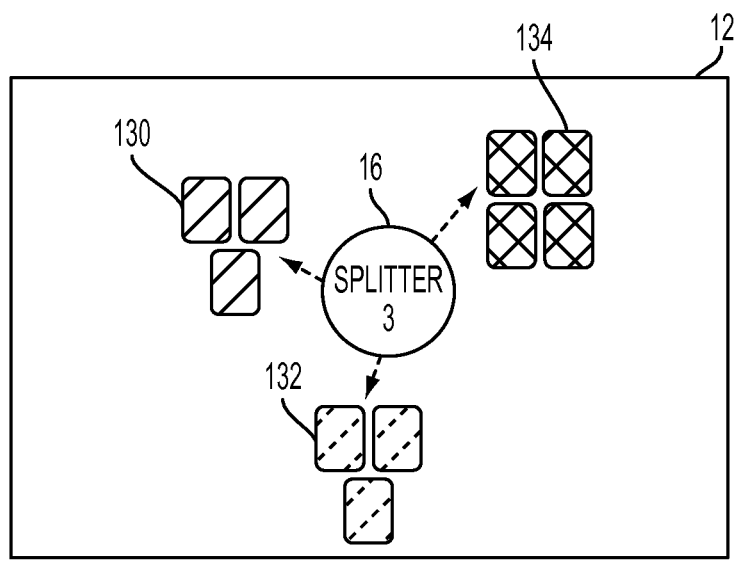

With reference to FIGS. 12 and 13, the widget 16 may serve as a clustering tool in one embodiment. Clustering in general is the task of discovering homogeneous groups of objects within a data set. The document clustering plays a major role in the range of technologies that can help supporting researchers' activities (e.g., document review, tagging or discovery), especially when dealing with large volumes of documents. Although it is a well-known data mining problem and a number of algorithms have been proposed to solve it, the translation of this functionality onto a multi-touch interface is not straightforward, especially when targeting use of the system by non-expert users.

The clustering widget 16 or "splitter" has a number of sides, such as from 2-6 virtual sides, each side corresponding to a predetermined (maximum) number of clusters. Each side thus corresponds to a number n of clusters to compute, in the range of 1 to N. Flipping the splitter widget allows the user to select the desired number of clusters to compute. Moving the widget onto a group of documents has the effect of breaking the set of documents into n sets of documents placed around the widget.

The user selects the desired number of clusters by flipping the widget to display the side which displays a representation of that number of clusters. As an example, the side for three clusters may show the number "3", or three dots, or the like. As will be appreciated, the cluster numbers can proceed sequentially, such as 2, 3, 4, 5, 6, etc. with the sides. In other embodiments, suitable cluster numbers for a given application may be provided, such as 3, 5, 8, 10, which are not sequential.

The exemplary displayed graphic objects 22, 24, in this embodiment, may represent a set of electronic text documents 68, 70 stored in memory 58. Attributes 72 of the text documents, which cause the graphic object to respond to a widget, in this case, can be based on the presence or absence of textual content, such as words or text strings, or the document content as a whole, such as the frequencies of keywords found in the document, cluster based attributes generated by automatically assigning the documents to one of a predetermined clusters based on similarity, or any other attribute which can be extracted, from the document or from an associated external metadata file, such as date sent, author, metadata, such as document size, document type, image content, and the like. Clustering of documents based on similarity is described for example, in U.S. Pub. Nos. 2007/0143101 (now U.S. Pat. No. 7,813,919), 2007/0239745 (now U.S. Pat. No. 7,720,848), 2008/0249999 (now U.S. Pat. No. 7,711,747), and U.S. Pub No. 2010/0088073, the disclosures of which are incorporated herein in their entireties by reference.

The clustering widget 16 operates in a mode similar to a magnet widget in its repelling interaction mode. This "splitter" is an N-side widget that operates the clustering of the set of documents on which it has been placed or moved. As an example, FIG. 12 shows a set 62 of graphic objects documents gathered in a cloud. When the splitter 16 with its functionality set to 3 (clusters) is brought near to the cloud, three non-overlapping clusters 130, 132, 134 form, i.e., three groups of graphic objects, each of which is discretely located at a distance from the other groups, as shown in FIG. 13. The clusters may have the same size (same number of graphic objects) or may be of different sizes, depending on the clustering algorithm used and the document attributes considered. Some of the clusters may be empty, i.e., without any documents, and thus the number of clusters visible on the display may be less, in some cases, than the number of clusters selected for the splitter.

Moving the widget 16 away from the graphic objects cancels the partition and returns the graphic objects to their original grouping. A flick on the widget changes the number of clusters to compute through the splitter.

A suitable touch gesture, such as double tap onto the splitter widget 16, makes the partition of the clustering permanent. If the partition has been made permanent, the user can move the splitter widget 16 towards one of the newly created groups to re-apply the clustering and refine the document partition. As an example, the user may thus make three new sub-clusters from one of the clusters 130, 132, 134, or flip the splitter to create a different number of sub-clusters.

Keywords can be computed by the clustering and returned as a description of each cluster. Each cluster is thus assigned a set of keywords. Some of the keyword sets may be partially overlapping. In general, for any two clusters 130, 132, fewer than all their keywords are in common, i.e., at least one of the keywords is different.

The exemplary TUI system and method described herein merges the setting selection-action with the display-layout of the widget setting itself. For example, it uses the number of rotations and/or the angle of rotations of the widget on the display; provides simple control and operation of object clustering on a TUI, and provides a natural and understandable visual feedback of the action.

As will be appreciated, the widget 16 may also find use as a virtual magnet for use in query generation, according to the method described in application Ser. No. 13/031,336, and for other document tasks, as described in U.S. Pub. No. 20100313124 and U.S. Pub. No. 20100312725. For example, the system 50 may recognize different touch gestures for the widget functionality setting and for query generation or other tasks.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A tactile user interface comprising:
a touch sensitive display device;
memory which stores instructions configured for displaying a widget and a set of graphic objects on the display device,
the widget having a plurality of virtual sides, each of the sides being associated with a respective functionality, the widget being flipped, in response to a recognized touch gesture, from a first of the sides to a second of the sides, whereby the functionality of the widget is changed from a first functionality associated with the first side to a second functionality associated with the second side,
the graphic objects each being associated, in memory, with a respective document having attributes, the graphic objects exhibiting a response to the widget functionality of a currently displayed one of the sides of the widget based on the attributes, wherein the response of the graphic objects includes movement of at least some of the objects relative to the widget, such that graphic objects representing documents having an attribute corresponding the currently displayed side of the widget respond by moving towards the widget and graphic objects representing documents without the attribute respond in a different way.

2. The tactile user interface of claim 1, further comprising a processor which implements the instructions.

3. The tactile user interface of claim 1, wherein the widget has only two sides.

4. The tactile user interface of claim 3, wherein the two sides are opposed.

5. The tactile user interface of claim 1, wherein the flipping graphically illustrates the flipping of a coin.

6. The tactile user interface of claim 1, wherein the widget has at least three virtual sides.

7. The tactile user interface of claim 3, wherein the recognized gesture includes a plurality of different touch gestures, a first of the touch gestures being recognized for selection of a first of the at least three sides and a second of the touch gestures being recognized for selection of a second of the at least sides.

8. The tactile user interface of claim 1, wherein the widget has at least four virtual sides.

9. The tactile user interface of claim 1, wherein the first functionality is actuated only when the first side is displayed and the second side is hidden from view, and the second functionality is actuated only when the second side is displayed on the display device and the first side is hidden from view.

10. The tactile user interface of claim 1, wherein the recognized touch gesture includes a first recognized touch gesture for flipping the widget from the first side to the second side and a second gesture, different from the first gesture, for flipping the widget from the second side to the first side.

11. The tactile user interface of claim 1, wherein when the widget is flipped, it is graphically represented as a rotation about an axis between the first and second sides.

12. A tactile user interface comprising:
a touch sensitive display device;
memory which stores instructions configured for displaying a set of graphic objects on the display device and for displaying a widget on the display device which is positionable near the graphic objects,
the widget having a plurality of virtual sides, each of the sides being associated with a respective functionality, the widget being flipped, in response to a recognized touch gesture, from a first of the sides to a second of the sides, whereby the functionality of the widget is changed from a first functionality associated with the first side to a second functionality associated with the second side,
the graphic objects each being associated, in memory, with a respective item having attributes, the graphic objects exhibiting a response to the widget functionality of a currently displayed one of the sides of the widget based on the attributes, wherein each functionality comprises a clustering functionality such that each of a plurality of the sides of the widget is associated with a different number of clusters, the memory storing instructions for clustering the graphical objects into a number of clusters as a function of the attributes of the items, the number of clusters corresponding to the number of clusters associated with the currently displayed side of the widget.

13. The tactile user interface of claim 1, wherein the attributes include text-related attributes.

14. The tactile user interface of claim 13, wherein the memory stores a language identifier and each of the widget functionalities is associated with identification of a respective one of a set of languages for text of the documents.

15. The tactile user interface of claim 12, wherein the items include documents.

16. The tactile user interface of claim 12, wherein the widget has at least three sides, each side being associated with a respective number of clusters.

17. The tactile user interface of claim 12, wherein a recognized gesture fixes an assignment of the graphic objects to the clusters, and the widget is actuable to cluster one of the clusters into a number of sub-clusters, the number of the sub-clusters corresponding to the number of clusters associated with the currently displayed side of the widget.

18. The tactile user interface of claim 1, wherein each functionality comprises a categorization functionality and the system includes a classifier trained to assign items to one of a plurality of categories based on the item attributes, each of the plurality of sides of the widget being associated with one of the categories such that a response is exhibited in a graphic object for which the classifier assigns a probability of the corresponding item being in the category, when the assigned probability is over a threshold.

19. The tactile user interface of claim 1, wherein the response to the widget functionality of a currently displayed one of the sides of the widget is actuated when the widget is moved from a first position, away from the graphic objects, to a second position, closer to the graphic objects.

20. A method for selection of a functionality for a widget displayed on a tactile user interface comprising:
displaying a widget and a set of graphic objects contemporaneously on a display device of a tactile user interface, the widget having a plurality of virtual sides, each of the sides being associated with a respective functionality, the first and second sides each displaying a representation of the respective widget functionality, the graphic objects each being associated, in memory, with a respective item having attributes, the graphic objects exhibiting a response to the widget functionality of a currently displayed one of the sides of the widget based on the attributes of the respective item, wherein the response of the graphic objects includes movement of at least some of the objects relative to the widget, such that graphic objects representing documents having an attribute corresponding the currently displayed side of the widget respond by moving towards the widget and graphic objects representing documents without the attribute respond in a different way;
with a processor, recognizing a touch gesture on the widget corresponding to a transformation of the widget from a first of the sides to a second of the sides;
displaying the widget being flipped, in response to the recognized touch gesture, from the first of the sides to the second of the sides, whereby the functionality of the widget is changed from a first functionality associated with the first side to a second functionality associated with the second side.

21. The method of claim 20, wherein the first functionality is actuated only when the first side is displayed and the second side is hidden from view, and the second functionality is actuated only when the second side is displayed on the display device and the first side is hidden from view.

22. The method of claim 20, further comprising providing for a user to cluster the graphic objects with the widget, a functionality of each of the sides corresponding to a respective different number of clusters.

23. A computer program product comprising a non-transitory storage medium which stores instructions, which when executed by a computer perform the method of claim 20.

24. A reconfigurable widget comprising:
a first virtual side associated in memory of a computing device with a first functionality selected from a predetermined set of functionalities, each of the functionalities being operable on displayed objects when the widget is moved towards the displayed objects, each object representing respective document, the first functionality being actuated only when the first side is displayed on a touch sensitive display device and the second side is hidden from view; and
a second virtual side associated with a second functionality selected from the predetermined set of functionalities, the second functionality being actuated only when the second side is displayed on the display device and the first side is hidden from view;
the widget being rotatable about an axis between the first and second sides in response to a recognized touch gesture on the display device, and wherein a response of the displayed objects includes movement of at least some of the objects relative to the widget, such that displayed objects representing documents having an attribute corresponding the currently displayed side of the widget respond by moving towards the widget and displayed objects representing documents without the attribute respond in a different way.

* * * * *